United States Patent
Shivanna et al.

(10) Patent No.: US 10,740,468 B2
(45) Date of Patent: Aug. 11, 2020

(54) MULTIPLE ROOTS OF TRUST TO VERIFY INTEGRITY

(71) Applicant: HEWLETT PACKARD ENTERPRISE DEVELOPMENT LP, Houston, TX (US)

(72) Inventors: Suhas Shivanna, Bangalore (IN); Patrick L Gibbons, Magnolia, TX (US); Shiva R Dasari, Houston, TX (US); Luis E Luciani, Jr., Tomball, TX (US); Kevin G Depew, Spring, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 333 days.

(21) Appl. No.: 15/715,020

(22) Filed: Sep. 25, 2017

(65) Prior Publication Data

US 2018/0096154 A1  Apr. 5, 2018

(30) Foreign Application Priority Data

Sep. 30, 2016  (IN) .............................. 201641033600

(51) Int. Cl.
*G06F 21/57* (2013.01)

(52) U.S. Cl.
CPC .......... *G06F 21/577* (2013.01); *G06F 21/572* (2013.01); *G06F 21/575* (2013.01); *G06F 2221/034* (2013.01)

(58) Field of Classification Search
CPC ...... G06F 21/57; G06F 21/572; G06F 21/575; G06F 21/577
See application file for complete search history.

(56) References Cited

U.S. PATENT DOCUMENTS

| | | | | |
|---|---|---|---|---|
| 6,185,678 | B1* | 2/2001 | Arbaugh | G06F 21/575 713/2 |
| 7,506,380 | B2* | 3/2009 | Hunter | G06F 21/575 713/1 |
| 2008/0155331 | A1* | 6/2008 | Rothman | G06F 11/1417 714/36 |
| 2009/0259854 | A1* | 10/2009 | Cox | G06F 21/575 713/189 |
| 2011/0131447 | A1* | 6/2011 | Prakash | G06F 21/572 714/19 |

(Continued)

OTHER PUBLICATIONS

Jill Caugherty, "System x Trusted Platform Assurance Establishes a Secure Foundation for Upper Layer Workloads", IBM X86 Servers, available online at <https://web.archive.org/web/20150405004606/https://www304.ibm.com/connections/blogs/ibmx86/entry/trusted_platform_assurance?lang=en_us>, Sep. 26, 2014, pp. 1-2.

*Primary Examiner* — Shanto Abedin
*Assistant Examiner* — Adrian Stoica
(74) *Attorney, Agent, or Firm* — Hewlett Packard Enterprise Patent Department

(57) ABSTRACT

An example computing system in accordance with an aspect of the present disclosure includes a first controller and a second controller. The first controller is to verify integrity of a first root of trust (ROT), and generate an integrity signal indicating the results. The second controller is to verify integrity of a second ROT, write the firmware image to the first controller, and verify integrity of the written firmware image.

12 Claims, 3 Drawing Sheets

(56) References Cited

U.S. PATENT DOCUMENTS

| | | | | |
|---|---|---|---|---|
| 2012/0159137 A1* | 6/2012 | Khosravi | ............ | G06F 21/572 |
| | | | | 713/2 |
| 2013/0097412 A1* | 4/2013 | Dasari | ................... | G06F 9/4405 |
| | | | | 713/2 |
| 2013/0275659 A1* | 10/2013 | Langas | ................. | G06F 3/0605 |
| | | | | 711/103 |
| 2014/0310509 A1* | 10/2014 | Potlapally | ........... | G06F 11/1417 |
| | | | | 713/2 |
| 2014/0351569 A1* | 11/2014 | Durand | ................... | G06F 8/654 |
| | | | | 713/1 |
| 2015/0277930 A1* | 10/2015 | Sarangdhar | ........... | G06F 21/575 |
| | | | | 713/2 |
| 2018/0034793 A1* | 2/2018 | Kibalo | ................. | G06F 21/575 |

* cited by examiner

MULTIPLE ROOTS OF TRUST TO VERIFY INTEGRITY

BACKGROUND

Security attacks on computing systems can affect firmware and hardware layers. Not only is there a need to protect the storage of a computing system, but also the firmware images that can serve as core components of a computing system. If a core component is compromised by a security attack, it is possible that the computing system will be unable to even boot up.

BRIEF DESCRIPTION OF THE DRAWINGS/FIGURES

DETAILED DESCRIPTION

There is a drive to improve the protection, detection and recovery features in computing systems hardware and core platform firmware deliverables. Firmware security detection features can validate the integrity of firmware images at boot up. However, there is still a chance of attackers exploiting a weakness in firmware designs to mount an attack to corrupt firmware images stored in the computing system (e.g., in flash Read-Only Memory (ROM)). There is also a risk of unintentional corruption of firmware (e.g. power outages or reset operations during firmware updates, etc.), even during a routine firmware update process. Existing utilities or standalone applications that can be used to recover from corrupted firmware images are cumbersome, manual, and insecure, because such utilities do not rely on a hardware root of trust, and do not perform signature validation in a robust and consistent manner.

To address such issues, some example implementations described herein can use an independent second root of trust (ROT), such as one incorporated with the computing system's Basic Input/Output System (BIOS), to recover a primary ROT, such as a computing system's Baseboard Management Controller (BMC). Such example implementations enable automated recovery of a ROT module, using another ROT module, to provide hardware assistance (e.g., integrity detection using hardware signals). Such ROTs can be established using Application-Specific Integrated Circuits (ASICs) or other chips/controllers in the computing system server hardware. Such secure and automated recovery of corrupted Root of Trust firmware images can enable an authentic BIOS software to act as a Root of trust (ROT) in a secure manner to detect and recover the root of trust platform for another component, such as a firmware component BMC. Such recovery implementations can be protected using hardware signals and physical presence switches. Recovery operations can be initiated using an authentic copy of the firmware image stored in the computing system (e.g. NAND storage in a hardware server), or by using an authentic image retrieved from the network using a Unified Extensible Firmware Interface (UEFI) network stack or other network access.

Figure 1:
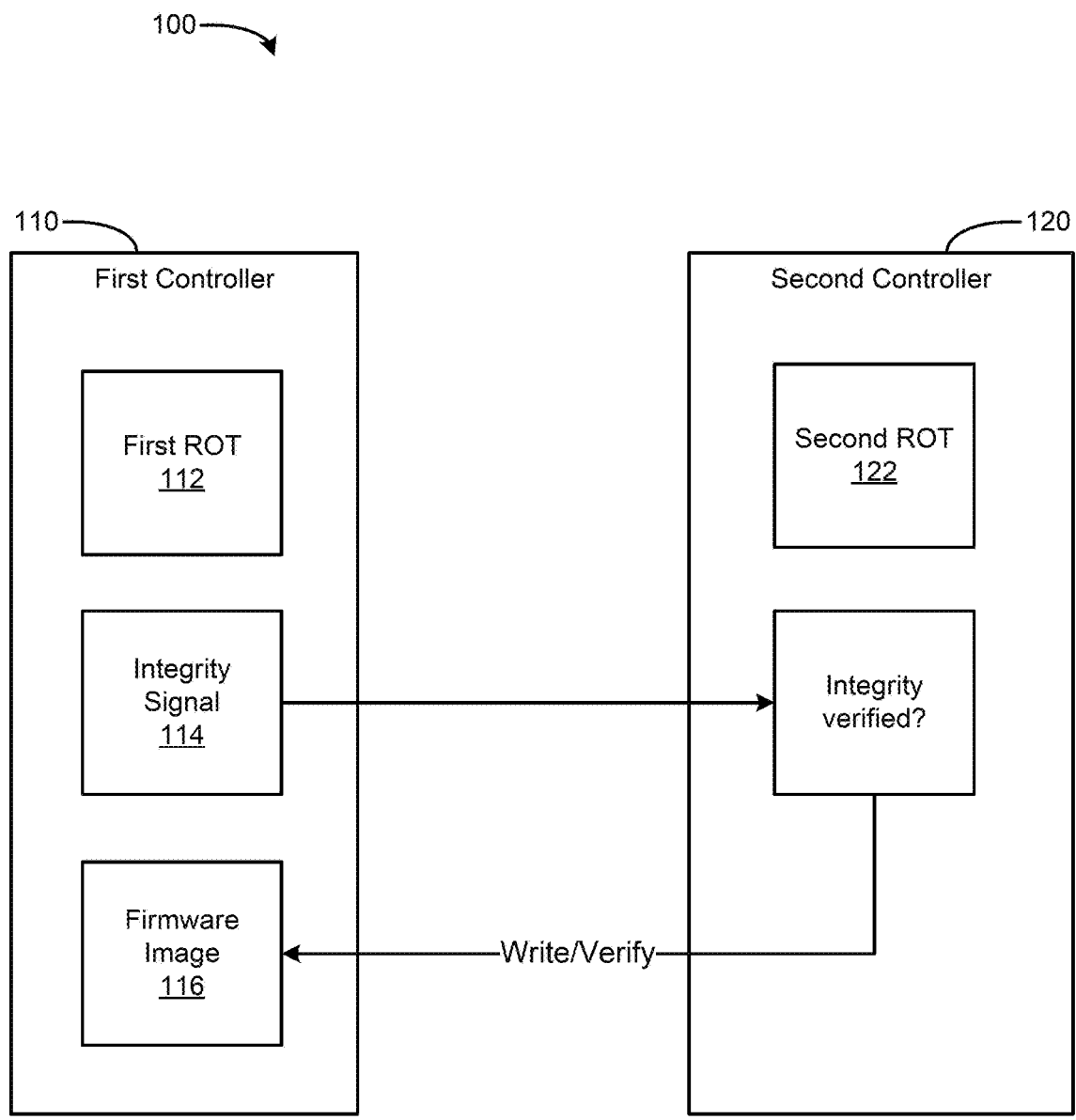
FIG. 1 is a block diagram of a computing system including a first controller and a second controller according to an example.

FIG. 1 is a block diagram of a computing system 100 including a first controller 110 and a second controller 120 according to an example. The first controller 110 is associated with first root of trust (ROT) 112, integrity signal 114, and firmware image 116. The second controller 120 is associated with second root of trust 122, and can write/verify the firmware image 116 of the first controller 110.

The first controller 110 is to verify integrity of its own, first ROT 112, and generate the integrity signal 114 indicating whether the integrity of the first ROT 112 is verified. In general, ROT can represent a set of functions trusted by the computing system's operating system (OS), and can control a trusted computing platform cryptographic processor or provide other functionality, such as drive encryption, detection and reporting of unauthorized changes to the operating system or programs, detection of rootkits, preventing inappropriate reading from or writing to portions of memory, hardware-based digital rights management (DRM) support, and so on.

In addition to the first ROT 112 and corresponding first controller 110, the computing system 100 also includes the second controller 120 and associated second ROT 122. The second controller 120 is to verify integrity of its own second ROT 122 and identify, independent of the first controller 110, whether the integrity of the first ROT 112 (of the first controller 110) is verified. The second controller 120 can perform the verifying of the integrity of the first ROT 112 based on checking for the integrity signal 114. If the integrity signal 114 is not present (or otherwise indicates that the integrity of the first ROT 112 is not verified), the second controller 120 can write firmware image 116 to the first controller 110. In this manner, the integrity of the first ROT 112 can be restored, in response to identifying that the first ROT 112 is not verified. The second controller 120 also can verify integrity of the written firmware image 116 of the first controller 110.

The first controller 110 of the computing system 100 also can perform similar functionality for the second controller 120, such that either controller can verify and/or restore the other controller. For example, the second controller 120 can check its own integrity and generate a second integrity signal (similar to the first integrity signal 114 generated by the first controller 110). The first controller 110 can then identify, independent of the second controller 120, whether the integrity of the second ROT 122 is verified, based on checking the second integrity signal. The first controller 110 can then write a firmware image to the second controller 120, corresponding to restoring the integrity of the second ROT 122, in response to identifying that the second ROT 122 is not verified. The first controller 110 can then verify integrity of the written firmware image of the second controller 120.

The integrity signal 114 can be provided as an automated hardware signal, to indicate whether or not the first ROT 112 has passed the integrity check. In an example implementation, when the computing system 100 boots up, if the first controller 110 is not able to verify integrity, the second controller 120 can use the integrity signal 114 to identify when to take over the computing system 100 and recover the first ROT 112.

The first controller 110 and the second controller 120 are illustrated as separate chips, and can be implemented in various forms such as an ASIC, a chipset, a processor, or other controller. In an example, the controllers can be implemented as a baseboard management controller (BMC), or management processor (MP). A given controller 110, 120 can store a hash of an immutable block of the first ROT 112 and/or the second ROT 122, which can be used to validate the first and/or second ROTs 112, 122. In an example implementation, the first controller 110 can provide management software functionality and firmware components that are always on. The first controller 110 can serve as a core of the manageability address system to control system fans, monitor ports and manage OS updates, firmware updates, and the like.

The first and second controllers 110, 120 are shown as separate hardware devices. In alternate examples, the first and second controllers 110, 120 can be implemented on the same chip/controller. The second controller 120 can be provided by a chipset, and the first controller 110 can be provided as a management processor, such as the server management Integrated Lights-Out (iLO) ASIC by Hewlett Packard Enterprise®. A management processor can include a baseboard management controller (BMC). In an alternate example implementation, the roles of the first controller 110 and the second controller 120 can be reversed (e.g., the first controller 110 provided by a chipset, and the second controller 120 provided by a management processor, etc.). A chipset with support from UEFI/BIOS can serve as a given controller(s).

The first controller 110 can detect whether first controller 110 is corrupted, as well as whether the second controller 120 is corrupted. The firmware images 116 (for the first controller 110, as well as for the second controller 120, whose firmware image is not shown in FIG. 1) can be kept in two different storage devices (e.g., flash memory) to avoid creating a single point of failure. Thus, example implementations of computing system 100 can provide multiple ROT components having the capability to recover each other, all in a single system/chassis. Thus, the first controller 110 can boot the computing system 100 as a management processor, and the second controller 120 could verify itself as a UEFI chipset (e.g., using a hash or a key to verify the boot block of the UEFI code for the second controller 120). By enabling bi-directional recovery from firmware attacks within a computing system 100, based on first and second ROTs 112, 122, example implementations described herein help to detect and automate recovery of root of trust firmware images from an authentic firmware image acting as a secondary ROT 122 to recover the first ROT 112, or vice versa.

The first and/or second controllers 110, 120 can place the computing system 100 in high secure modes, such as system management mode (SMM) to devote computing resources (such as processing time) for interacting securely with the first and second ROTs 112, 122. For example, while the computing system 100 is up and running, a controller 110, 120 can issue an SMI, to invoke code that is part of the UEFI BIOS stack to pull the host central processing units (CPUs) from running OS some activity, and instead direct them to running some of the UEFI BIOS stack, effectively sharing the host processor with the OS to run UEFI BIOS code on the host processors. When performing a recovery of the firmware image 116, the computing system 100 can go into a secure mode to close open ports and prevent access to the ports, to increase system security and prevent attacks when performing the update.

Figure 2:
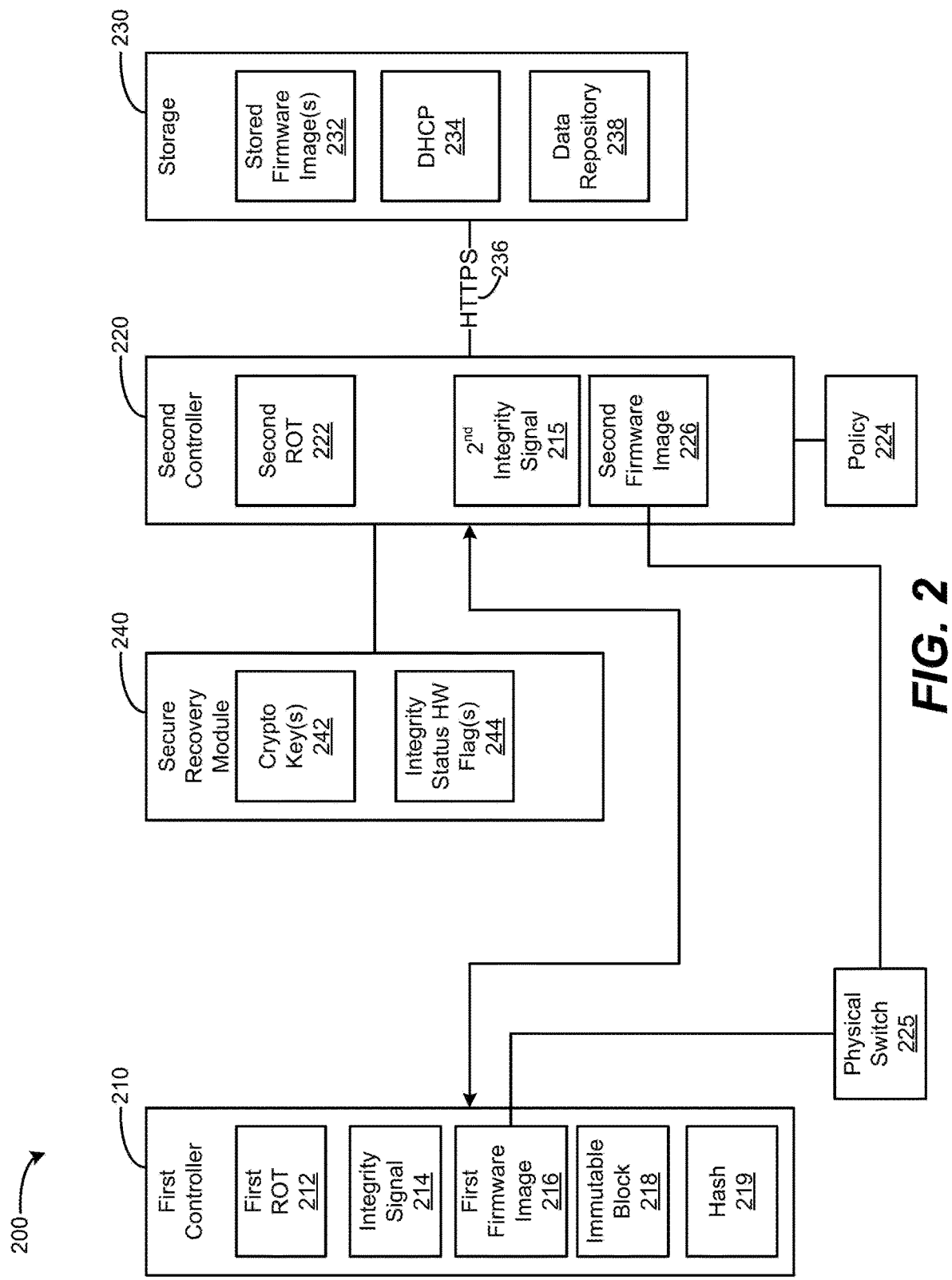
FIG. 2 is a block diagram of a computing system including a first controller, a secure recovery module, a second controller, and a storage according to an example.

FIG. 2 is a block diagram of a computing system 200 including a first controller 210, a secure recovery module 240, a second controller 220, and a storage 230 according to an example. The first controller 210 is associated with a first Root of Trust (ROT) 212, an integrity signal 214, a first firmware image 216, and immutable block 218, and a hash 219. The secure recovery module 240 is associated with crypto key(s) 242 and integrity status hardware flags 244. The second controller 220 is associated with second ROT 222 and second firmware image 226. The storage 230 is associated with stored firmware images 232, Dynamic Host Configuration Protocol (DHCP) 234, and data repository 238. The physical switch 225 can interact with the first and second controllers 210, 220. The controllers 210, 220 can interact with policy 224, and can interface with storage 230 via Hypertext Transfer Protocol Secure (HTTPS) 236 or other communication protocol. As represented by the bidirectional arrows between first controller 210 and second controller 220, the first controller 210 can write a firmware image to the second controller 220, similar to how the second controller 220 can write a firmware image to the first controller 210 (e.g., based on the first controller 210 checking whether the second firmware image 226 is verified according to an integrity signal).

The computing system 200 can use the hardware root of trust 212, such as in an iLO ASIC, as one of the building blocks for a recovery solution initiated by the second controller 220. The immutable block 218 can be used to validate the integrity of the rest of the first firmware image 216. The optional hardware integrity signal 214 can be used to indicate the integrity of the first firmware image 216, and the computing system 200 can default to interpreting a non-asserted integrity signal 214 as indicating an invalid image. After successfully validating the first firmware image 216 using the first ROT 212, the integrity signal 214 can be asserted, indicating to other components that the first firmware image 216 has been successfully validated. The firmware recovery can also be triggered using an additional physical switch 225 (such as a security override switch or physical presence hardware security switch, which can be used to protect access to the first firmware image 216 by the firmware/OS). The physical switch 225 can communicate to BIOS a user intent/physical presence, before initiating the automatic recovery of the first firmware image 216.

The second controller 220, such as a UEFI/BIOS, is enhanced to support automated recovery of the first firmware image 216 for the first ROT 212. The second controller 220 provides the second ROT 222 for the computing system 200. The second controller 220 can boot the computing system 200 without dependency on the first controller 210. The second controller 220 can include an immutable block (not shown, similar to immutable block 218 of the first controller 210) that can serve as the second ROT 222 for validation of the second firmware image 226 of the second controller 220 (e.g., a BIOS image). The second ROT 222 then can be used to verify integrity of the second firmware image 226, e.g., using private/public key signing techniques, before initiating recovery operations. The second firmware image 226 also can contain a public key to verify the second ROT 222 firmware, and can contain a secure recovery module 240, that can read a firmware image either from a local storage device such as NAND Flash, or via the network using Dynamic Host Configuration Protocol (DHCP), Pre-boot Execution Environment (PXE), and/or Hypertext Transfer Protocol Secure (HTTPS) boot options. A stored firmware image 232 can be stored in storage 230 (e.g. a secure internal storage such as NAND, or a remote network storage located at a remote network location), and the stored firmware image 232 also can be retrieved from the network using a hardened UEFI environment (e.g. where network ports are disabled).

After successfully validating the integrity of the second firmware image 226, the second controller reads the status of the integrity signal 214. If the second controller 220 identifies the status as not valid (e.g., an indication of a fault, or the absence of a signal that by default is interpreted as not valid), the second controller 220 can wait in a loop for a configured time, to check whether the status of the integrity signal 214 changes within the specified time (e.g., to accommodate times where the first controller 210 may be in the process of a reset). If the status of the integrity signal 214 does not change after the configured time, the second controller 220 scans for the status of the physical switch 225. If the physical switch 225 is set to ON (indicating physical presence and user's intent for recovery), the second controller 220 loads the appropriate modules (e.g., based on BIOS policies 224 from NAND storage) or downloads the appropriate firmware image 232 from the network using the UEFI network stack (DHCP options, or PXE Boot or HTTPS download). After successfully downloading the second firmware image 226, the secure recovery module of the second controller 220 can verify the signature using the public key of the first controller 210, and write the mutable first firmware image 216 to the first controller 210, and verifies the written first firmware image 216. The second controller 220 can then wait for the first controller 210 to initialize with the new first firmware image 216 before rebooting in normal mode. Recovery actions can be logged to a persistent store on the device, or to a network logging device (configurable through BIOS policies). To enable deep forensic analysis, the second controller 220 can be configured to store the corrupted first firmware image 216 in a separate data repository 238 on the device or on the network.

The storage 230 can provide a source from which the second controller 220 is to retrieve the firmware image 232 corresponding to the first controller 210, in response to identifying that the integrity of the first ROT 212 or the first firmware image 216 is not verified.

The policy 224 can be used by a given controller 210, 220, and can be configurable. For example, as illustrated, the second controller 220 can refer to the policy 224 and obtain the firmware image according to the policy, which can include locations of storage 230 or other storage location and protocol information.

The physical switch 225 is to selectively prevent controller access to firmware images 216, 226, and/or 232. The physical switch also can be used by users to initiate the recovery operation. For example, a user can actuate the switch to initiate the recovery operation, thereby indicating via the switch that the firmware image to be affected by the recovery is to be otherwise protected from controller access. Thus, the second controller 220 can check the switch status to identify whether the first controller 210 is in the process of being updated, and if the switch indicates the first controller 210 is not being updated, the second controller 220 can proceed to access the first firmware image 216.

The immutable block 218 is shown included in first controller 210. In alternate examples, the immutable block 218 be included elsewhere, such as in second controller 220. The immutable block 218 can serve as the ROT for firmware image validation, usable to validate firmware image integrity. The immutable block 218 is immutable because its controller (shown as being first controller 210) itself enforces the inability to write to the boot block itself, preventing writes/erases in a certain range, such as from offset 0 to offset 64K.

The hash 219 can be stored by a given first or second controller 210, 220, such as the second controller 220 being provided as a Management Processor (MP) storing the hash 219 of an immutable block 218 of the second ROT 222 and/or the first ROT 212. The hash 219 then can be used to validate the corresponding second ROT 222 or the first ROT 212. In an alternate example implementation, an encrypted signature can be used, to provide the functionality described above that would otherwise be provided by a hash.

As to the interaction with storage 230, the second controller 220 can obtain the appropriate firmware image 232 using DHCP 234, e.g., according to a Dynamic Host Configuration Protocol (DHCP) response packet containing an option string with configuration information corresponding to obtaining the firmware image 232.

The secure recovery module 240 can be used to read the firmware image 232 from storage 230, and provide cryptographic keys 242 for cryptographic key functionality. Although a single secure recovery module 240 is shown, multiple such modules can be used. For example, the first controller 210 can have a secure recovery module 240 to recover (based on cryptographic key functionality and integrity verification) the second ROT 222 of the second controller 210, and/or the second controller 220 can have a secure recovery module 240 to recover the first ROT 212 of the first controller 210.

As for reading the stored firmware 232, the location of where to find the recovery image can be specified in various ways. In the example implementation illustrated in FIG. 2, the DHCP protocol enables the use of an option string, to specify configurations in the DHCP response packet, through which the recovery address can communicated (e.g., specifying a uniform resource location (URL) from which the system can retrieve the image). Additionally, HTTPS boot can be used to download files in the firmware. Location information also can be specified in the policy 224. For example, a user can configure the policy 224 to specify where the user would prefer the stored firmware images 232 to be located. Accordingly, automated approaches are possible for restoring first controller 210 or second controller 220, based on, e.g., a static policy or dynamically configured information from a data center using a response field from the DHCP response packet. Standards such as Preboot eXecution Environment (PXE) boot or Hypertext Transfer Protocol Secure (HTTPS) boot can be used to enable the second controller to obtain the firmware image, enabling the controllers to not only boot to a network image, but also to retrieve an image from a specified location. Such approaches are fit into the BIOS/recovery stack of a given controller.

The cryptographic key(s) 242 are shown corresponding to secure recovery module 240 associated with the second controller 220. In alternate example implementations, keys can be kept at each of the first controller 210 and/or second controller 220 (e.g., based on each controller being associated with a secure recovery module 240). Accordingly, the first controller 210 can use its key(s) to check the validity of the second ROT 222, and the second controller 220 can use its key(s) to check the validity of the first ROT 212. A private/public key system can be used to verify the integrity of downloaded images. Because each controller can use its own key(s), if one controller and/or its key(s) is compromised, the computing system 200 is still secure at least by virtue of the remaining uncompromised keys of the other controller. In an example implementation, key functionality can be provided by a Trusted Platform Module (TPM), to provide secure storage and the use of keys to ensure that the various controllers/components are valid before allowing the computing system to start. Updates to the first ROT 212 and the second ROT 222 can be monitored and protected by the computing system 200, to disallow simultaneous updates to both the first and second controllers 210, 220 (e.g. setting one controller to write enabled, and the other controller to write protected, until the write enabled controller is updated and verified). This ensures that both controllers cannot be attacked from an unknown vulnerability.

The various flag(s) 244 can be used by various components to indicate status. For example, when the computing system 200 boots up, the first controller 210 firmware comes up by default. Assuming the first controller 210 identifies that the immutable block 218 (e.g., a boot block) is compromised, or that something associated with the first controller 210 is compromised, the computing system 200 can indicate this compromised state using a corresponding flag 244 by setting it to indicate the compromised state. When this flag 244 is set, the second ROT 222 can identify, based on the flag 244, that it needs to recover the first ROT 212 automatically. Thus, the flag(s) 244 can provide an example implementation for the integrity signal 214. Similarly, the first controller 210 can boot the computing system 200, check the flag(s) 244 and determine that the computing system 200 needs to recover, and launch the recovery modules. After restoring the appropriate components/images, and verifying such components/images, the hardware can verify the immutable boot block, and that boot block in turn can be used to verify a subset of blocks, and once the verification is complete the flag(s) 244 can be asserted by a controller to indicate that the system is in a good state. Accordingly, such features enable hardware-based, automated recovery. The flag(s) 244 can be implemented as a register that the controllers, such as UEFI firmware, can read after initializing themselves. In an example, the integrity signal 214 can be connected to the system processor, to enable the computing system to be aware of hardware system status.

Thus, when one of the controllers 210, 220 becomes corrupted, the other controller can recover an image either from a local memory storage (such as local storage devices inside the chassis), or via the network (e.g., based on customer configuration or policies, etc.). That controller can then verify the integrity of the retrieved image using the keys that it stores, and then flash the retrieved image.

With the combination of hardware signals/switches, the example implementations described herein enable a secure solution enabling recovery from corrupted firmware images using enhanced controllers. Example computing systems 200 can further protect the secure recovery module in a controller by running the code in highly secure mode such as SMM/SMI, turning off network ports during secure recovery operations and the like. Based on controller policies, the recovery solution can be initiated based on the state of the integrity signal 214, and can further rely on authorization of recovery from a network source using a username/password or a certificate (e.g., as specified in a policy) signed by a trusted Certificate Authority (CA).

Figure 3:
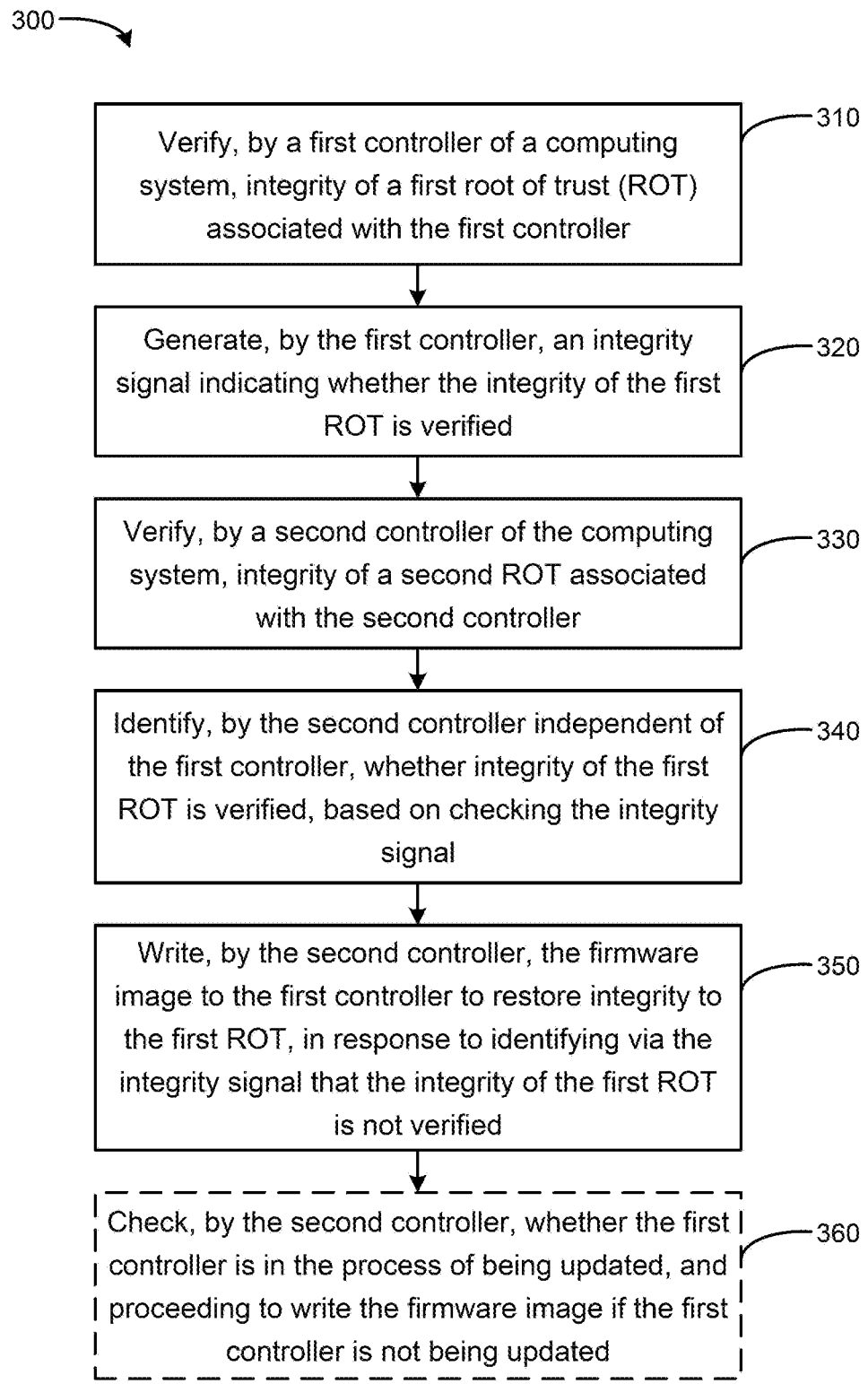
FIG. 3 is a flow chart based on restoring integrity to a root of trust according to an example.

Referring to FIG. 3, a flow diagram is illustrated in accordance with various examples of the present disclosure. The flow diagram represents processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 3 is a flow chart 300 based on restoring integrity to a root of trust according to an example. In block 310, a first controller of a computing system is to verify integrity of a first root of trust (ROT) associated with the first controller. For example, a management processor can check itself, as to whether its integrity is valid. In block 320, the first controller is to generate an integrity signal indicating whether the integrity of the first ROT is verified. For example, depending on the check of itself by the management processor, the management processor can update a hardware flag to generate an integrity signal indicating an invalid verification.

In block 330, a second controller of the computing system is to verify integrity of a second ROT associated with the second controller. For example, a UEFI/BIOS chipset can check the integrity of itself before proceeding to attempt recovery of the first controller. In block 340, the second controller is to identify, independent of the first controller, whether integrity of the first ROT is verified, based on checking the integrity signal. For example, the UEFI/BIOS chipset can check the hardware flag corresponding to the integrity signal. The UEFI/BIOS also can assume a default state of invalid, unless it identifies a signal indicating a valid state.

In block 350, the second controller is to write the firmware image to the first controller to restore integrity to the first ROT, in response to identifying via the integrity signal that the integrity of the first ROT is not verified. For example, the UEFI/BIOS can identify a remote network location for retrieving a firmware image to restore the unverified management processor, e.g., based on information in a user-configurable policy. In block 360, the second controller is to check whether the first controller is in the process of being updated, and proceed to write the firmware image if the first controller is not being updated. For example, the computing system can impose write protection during a firmware update of either controller, to prevent both controllers from potentially being affected by an issue with the firmware.

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., including a controller and/or processor of a computing device) can include and/or receive a tangible non-transitory computer-readable medium storing a set of computer-readable instructions (e.g., software, firmware, etc.) to execute the methods described above and below in the claims. For example, a system can execute instructions to direct a verification engine to verify integrity of a given ROT, wherein the engine(s) include any combination of hardware and/or software to execute the instructions described herein. As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A computing system, comprising:
   a first controller of a computing system to:
   verify integrity of a first root of trust (ROT) associated with the first controller, and generate an integrity signal indicating whether the integrity of the first ROT is verified; and
   a second controller of the computing system to:

verify integrity of a second ROT associated with the second controller;
identify, independent of the first controller, whether the integrity of the first ROT is verified, based on checking the integrity signal;
write a firmware image to the first controller, corresponding to restoring the integrity of the first ROT, in response to identifying that the first ROT is not verified;
verify integrity of the written firmware image of the first controller,
wherein the first controller is further to:
identify, independent of the second controller, whether the integrity of the second ROT is verified, based on checking a second integrity signal generated by the second controller;
write a firmware image to the second controller, corresponding to restoring the integrity of the second ROT, in response to identifying that the second ROT is not verified; and
verify integrity of the written firmware image of the second controller.

2. The computing system of claim 1, wherein the second controller is to retrieve, from storage external to the second controller, the firmware image corresponding to the first controller, in response to identifying that the integrity of the first ROT is not verified.

3. The computing system of claim 1, wherein the second controller is to obtain the firmware image according to a Dynamic Host Configuration Protocol (DHCP) response packet containing an option string with configuration information corresponding to obtaining the firmware image.

4. The computing system of claim 1, wherein the second controller is to obtain the firmware image based on at least one of Preboot eXecution Environment (PXE) boot or Hypertext Transfer Protocol Secure (HTTPS) boot.

5. The computing system of claim 1, wherein the second controller is to refer to a configurable policy and obtain the firmware image according to the policy.

6. The computing system of claim 1, wherein at least one of the first controller or the second controller includes an immutable block to serve as the ROT for firmware image validation and usable to validate firmware image integrity.

7. The computing system of claim 1, wherein at least one of the first controller or the second controller is a Management Processor (MP) storing a hash of an immutable block of at least one of the second ROT or the first ROT, used to validate the corresponding at least one of the second ROT or the first ROT.

8. The computing system of claim 1, further comprising a secure recovery module to read the firmware image from storage and provide cryptographic key functionality.

9. The computing system of claim 1, wherein the first controller includes a first secure recovery module to provide cryptographic key functionality to verify integrity of the second ROT or the firmware image for the second controller; and wherein the second controller includes a second secure recovery module to provide cryptographic key functionality to verify integrity of the first ROT or the firmware image for the first controller.

10. The computing system of claim 1, further comprising a data repository to isolate and store a copy of a corrupted firmware image of a given controller for forensic analysis.

11. A method, comprising:
verifying, by a first controller of a computing system, integrity of a first root of trust (ROT) associated with the first controller;
generating, by the first controller, an integrity signal indicating whether the integrity of the first ROT is verified;
verifying, by a second controller of the computing system, integrity of a second ROT associated with the second controller;
identifying, by the second controller independent of the first controller, whether integrity of the first ROT is verified, based on checking the integrity signal; and
writing, by the second controller, the firmware image to the first controller to restore integrity to the first ROT, in response to identifying via the integrity signal that the integrity of the first ROT is not verified;
identifying, by the first controller, independent of the second controller, whether the integrity of the second ROT is verified, based on checking a second integrity signal generated by the second controller;
writing a firmware image to the second controller, corresponding to restoring the integrity of the second ROT, in response to identifying that the second ROT is not verified; and
verifying integrity of the written firmware image of the second controller.

12. The method of claim 11, further comprising checking, by the second controller, whether the first controller is in the process of being updated, and proceeding to write the firmware image if the first controller is not being updated.

* * * * *